United States Patent
Sun et al.

(10) Patent No.: US 11,629,293 B2
(45) Date of Patent: Apr. 18, 2023

(54) SYSTEM FOR PRODUCING HYDROCARBONS BY HIGH-TEMPERATURE FISCHER-TROPSCH SYNTHESIS

(71) Applicant: YANKUANG ENERGY R&D CO., LTD., SHANGHAI, Shanghai (CN)

(72) Inventors: Qiwen Sun, Shanghai (CN); Jisen Liu, Shanghai (CN); Jianping Yue, Shanghai (CN)

(73) Assignee: YANKUANG ENERGY R&D CO., LTD., SHANGHAI, Shanghai (CN)

( * ) Notice: Subject to any disclaimer, the term of this patent is extended or adjusted under 35 U.S.C. 154(b) by 158 days.

(21) Appl. No.: 17/121,369

(22) Filed: Dec. 14, 2020

(65) Prior Publication Data
US 2021/0284915 A1    Sep. 16, 2021

(30) Foreign Application Priority Data
Mar. 10, 2020    (CN) .......................... 202010162121.1

(51) Int. Cl.
B01J 8/00 (2006.01)
B01J 8/18 (2006.01)
(Continued)

(52) U.S. Cl.
CPC .............. C10G 2/344 (2013.01); B01J 8/005 (2013.01); B01J 8/1809 (2013.01); B01J 8/1818 (2013.01);
(Continued)

(58) Field of Classification Search
CPC ....... B01J 8/00; B01J 8/005; B01J 8/18; B01J 8/1809; B01J 8/1818; B01J 8/1827;
(Continued)

(56) References Cited

FOREIGN PATENT DOCUMENTS

| CN | 1814350 A | 8/2006 | |
|---|---|---|---|
| CN | 1814576 A | 8/2006 | |
| CN | 103476906 A | * 12/2013 | ........... B01D 37/048 |

OTHER PUBLICATIONS

Machine translation of CN 103476906 A, which was published on Dec. 25, 2013 (Year: 2013).*

(Continued)

*Primary Examiner* — Natasha E Young
(74) *Attorney, Agent, or Firm* — Hamre, Schumann, Mueller & Larson, P.C.

(57) ABSTRACT

A system for producing a hydrocarbon by high-temperature Fischer-Tropsch synthesis is described. The system includes a Fischer-Tropsch synthesis unit, a reaction water separation unit, and a catalyst reduction unit. The catalyst reduction unit uses a gas containing the tail gas of the synthesis unit as a reducing gas and a small amount of synthesis gas for adjusting the hydrogen to carbon ratio, to react with the Fischer-Tropsch synthesis catalyst. After the reduction reaction, the reacted gas is cooled to room temperature, and enters a gas-liquid separator to obtain a gas phase and a liquid phase. The gas phase flows to a cryogenic separation unit to recover gaseous hydrocarbons. The liquid phase is separated into reaction water and Fischer-Tropsch oil products. The reduced catalyst is sent to the Fischer-Tropsch synthesis unit.

13 Claims, 3 Drawing Sheets

(51) Int. Cl.
  *B01J 8/24* (2006.01)
  *B01J 19/00* (2006.01)
  *B01J 19/24* (2006.01)
  *C10G 2/00* (2006.01)
  *C10G 31/00* (2006.01)
  *C10G 31/06* (2006.01)

(52) U.S. Cl.
  CPC .............. *B01J 8/1827* (2013.01); *B01J 8/24* (2013.01); *C10G 31/06* (2013.01); *B01J 2208/00026* (2013.01); *B01J 2208/00769* (2013.01); *C10G 2300/4006* (2013.01); *C10G 2300/4012* (2013.01); *C10G 2300/4018* (2013.01); *C10G 2300/4025* (2013.01); *C10G 2300/4081* (2013.01); *C10G 2300/701* (2013.01); *C10G 2300/703* (2013.01); *C10G 2400/20* (2013.01); *C10G 2400/22* (2013.01)

(58) Field of Classification Search
  CPC ..... B01J 8/24; B01J 19/00; B01J 19/24; B01J 2208/00; B01J 2208/00008; B01J 2208/00017; B01J 2208/00026; B01J 2208/00743; B01J 2208/00769; B01J 2231/00; B01J 2231/60; B01J 2231/64; B01J 2231/641; B01J 2231/648; C10G 2/00; C10G 2/30; C10G 2/32; C10G 2/34; C10G 2/342; C10G 2/344; C10G 31/00; C10G 31/06; C10G 2300/00; C10G 2300/10; C10G 2300/1022; C10G 2300/40; C10G 2300/4006; C10G 2300/4012; C10G 2300/4018; C10G 2300/4025; C10G 2300/4081; C10G 2300/70; C10G 2300/701; C10G 2300/703; C10G 2400/00; C10G 2400/20; C10G 2400/22

See application file for complete search history.

(56) References Cited

OTHER PUBLICATIONS

Machine translation of CN 1814576 A, which was provided in the IDS filed on Dec. 14, 2020 and published on Aug. 9, 2006 (Year: 2006).*
Machine translation of CN 1814350 A, which was provided in the IDS filed on Dec. 14, 2020 and published on Aug. 9, 2006 (Year: 2006).*
CN 1814576 A with machine translation, published on Aug. 9, 2006 (Year: 2206).*
CN 103476906 B with machine translation, published on Apr. 15, 2015 (Year: 2015).*

* cited by examiner

SYSTEM FOR PRODUCING HYDROCARBONS BY HIGH-TEMPERATURE FISCHER-TROPSCH SYNTHESIS

This application claims priority to Chinese Patent Application Serial No. CN202010162121.1, filed on Mar. 10, 2020.

FIELD OF TECHNOLOGY

The invention relates to the technical field of Fischer-Tropsch synthesis, in particular to a system for producing hydrocarbons by high-temperature Fischer-Tropsch synthesis.

BACKGROUND

With the increase in the demand for petroleum-based liquid fuels and the decrease in the available reserves of petroleum resources, the method for producing usable liquid fuels from solid fuels such as coal has attracted more and more attention.

At present, there are two methods for producing liquid fuels from coal: direct liquefaction and indirect liquefaction. Among them, indirect liquefaction is divided into two technologies: low-temperature Fischer-Tropsch synthesis and high-temperature Fischer-Tropsch synthesis. The low-temperature Fischer-Tropsch synthesis generally uses a slurry-bed reactor over the reaction temperature range 220-260° C.; the high-temperature Fischer-Tropsch synthesis generally uses a fluidized bed reactor over the reaction temperature range 330-360° C., and the Fischer-Tropsch synthesis reaction equation is:

$$nCO+(n+m/2)H_2 = C_nH_m + nH_2O + 165 \text{ kJ/molCO} \qquad (1)$$

$$CO + H_2O = CO_2 + H_2 + 40 \text{ kJ/molCO} \qquad (2)$$

Wherein the water gas shift reaction of formula (2) is a side reaction of the Fischer-Tropsch synthesis reaction.

The main advantages of the low-temperature slurry-bed reactor are that the reaction condition is mild and easy to control, and the product is high-carbon straight-chain alkanes, which is more suitable for the production of diesel and paraffin. Relatively speaking, the high-temperature Fischer-Tropsch synthesis has a shorter chain, a higher content of unsaturated hydrocarbons in the product, and a higher concentration of oxygen-containing organic matter in the reaction water. It is very suitable for the production of chemicals with higher added value, and the higher reaction temperature is also more conducive to heat recovery and utilization, which can by-produce high-quality medium and high-pressure steam. The design and operation of fluidized bed reactor for the high temperature Fischer-Tropsch synthesis are complicated. How to ensure the uniform distribution of the bed and the separation of gas and solid in the presence of heat transfer elements is the biggest difficulty in design. In addition to the reactor structure, the catalyst particle density, particle size distribution, gas density, viscosity and other indicators will have a direct impact on the distribution of the bed, requiring a lot of basic research and large-scale model tests to accumulate design data.

The inventor of the present patent has published patent ZL200510026967.8 which proposes a high-temperature Fischer-Tropsch synthesis method in a fluidized bed reactor, but it has the following shortcomings: 1. there is no clear catalyst reduction process and method and separation method of reaction water; no product features and product schemes are proposed, and the product advantage is the main advantage of the high temperature Fischer-Tropsch synthesis different from the low-temperature Fischer-Tropsch synthesis. 2. The outlet gas of the reactor directly enters the quench tower for washing and cooling, and all the heat enters the atmosphere through the cooling water, which is low in energy efficiency and environmentally unfriendly; the quench tower is equipped with a recirculation cooler which makes the quench tower system more complicated and increases the energy consumption.

The inventor of the present patent has published patent ZL200510026968.2 which proposes an industrial reduction method for a granular iron-based Fischer-Tropsch synthesis catalyst. Compared with the present invention, the original patent requires a large amount of fresh reducing gas and requires a reduction recycle compressor with higher energy consumption.

SUMMARY

The object of the present invention is to provide a system for producing a hydrocarbon by high-temperature Fischer-Tropsch synthesis in order to overcome the disadvantages of high energy consumption, high reducing gas consumption, lack of catalyst reduction methods, and inability to operate stably for a long time in the prior art.

The object of the present invention can be achieved through the following technical solutions:

A system for producing a hydrocarbon by high-temperature Fischer-Tropsch synthesis, comprising a Fischer-Tropsch synthesis unit for making synthesis gas undergo a Fischer-Tropsch synthesis reaction, a reaction water separation unit for separating reaction water generated during the reaction, and a catalyst reduction unit for reducing catalyst;

in the Fischer-Tropsch synthesis unit, fresh synthesis gas with H2 and CO as main components are mixed with a synthesis circulating gas, pass through a synthesis gas preheater to be heated to a temperature of not lower than 100° C., enter a fluidized bed Fischer-Tropsch synthesis reactor to undergo the Fischer-Tropsch synthesis reaction under an action of Fischer-Tropsch synthesis catalyst over the reaction temperature range of 300–500° C., a pressure of 1.0-5.0 MPa, and an operating linear velocity of 0.3-1.0 m/s; the high-temperature gas from the fluidized-bed Fischer-Tropsch synthesis reactor passes through a high-efficiency gas-solid separation element provided in the reactor to separate the entrained catalyst, and then enters a waste heat boiler to recover heat;

the high-temperature gas after heat is recovered by the waste heat boiler is washed and cooled by a quench tower and sent to a three-phase separator for separation to obtain a water phase, an oil phase and a gas phase; the oil phase is sent to a product processing unit as a light oil product, the water phase is sent to the reaction water separation unit after decompression, and the gas phase, after discharging part of purge gas, passes through a synthesis recycle compressor, as the synthesis circulating gas, to return to an inlet of the fluidized bed Fischer-Tropsch synthesis reactor.

The purge gas discharged from the gas phase can be used as reducing gas of the reduction unit, or directly used as fuel gas after cryogenic separation and recovery of hydrocarbon products such as methane and C2-C4 olefins.

The waste heat boiler is a vertical heat exchanger structure, and the high-temperature gas and boiler water from the fluidized bed Fischer-Tropsch synthesis reactor exchange heat in the waste heat boiler to generate saturated steam; the high-temperature gas flows through the tube side, and a gas direction is from top to bottom, and at least two of the waste heat boilers are provided, one of which is a standby equipment.

The quench tower is a tower plate tower, and a liquid accumulating tank in tower is provided under the bottom tower plate to collect heavy oil as a quench tower circulating liquid; the high-temperature gas after heat is recovered by the waste heat boiler is sprayed and washed with a heavy oil product extracted from tower bottom of the quench tower, and/or washed with a quench tower circulating liquid on a tower plate.

The content of olefins in the light oil product and heavy oil product is higher than 50%, and the main component of olefins is alpha olefin.

In the Fischer-Tropsch synthesis unit, a method for recovering methane and C2-C4 olefins from the purge gas is cryogenic separation or low-temperature oil washing combined with cryogenic separation.

The catalyst reduction unit is a batch operation unit, and the purge gas of the synthesis unit enters a fluidized bed reduction reactor as the reducing gas raw material and reacts with the Fischer-Tropsch synthesis catalyst in the fluidized bed reduction reactor for a catalyst reduction reaction over the reaction temperature range of 260–500° C., pressure of 0-5.0 MPa, and an operating linear velocity of 0.1-1.0 m/s. The amount of the purge gas of the synthesis unit meets the space velocity requirements for reduction, and no compressor is required for gas circulation; it should be noted that there is no synthesis purge gas during the startup of the equipment, and the first batch of the catalyst is directly reduced by synthesis gas in the synthesis reactor.

The gas at an outlet of the fluidized bed reduction reactor is cooled to room temperature after removing a solid, and enters a gas-liquid separator for gas-liquid separation to obtain a gas phase and a liquid phase, and the separated gas phase is cryogenically separated to recover a gaseous hydrocarbon, and the separated liquid phase is reaction water and Fischer-Tropsch synthesis liquid hydrocarbon; the reduced catalyst is sent to the Fischer-Tropsch synthesis unit.

Using the purge gas of the synthesis unit as the reducing gas can fully meet the space velocity and linear velocity requirements of the reduction unit, reduce the consumption of fresh reducing gas, and save the energy consumption of the reduction recycle compressor. It should be noted that the first batch of the catalyst is directly reduced with synthesis gas in the synthesis reactor during the initial startup of the equipment.

The method for controlling the reaction temperature in the fluidized bed reduction reactor is one or a combination of three methods by controlling gas temperature at the inlet of the fluidized bed reduction reactor, controlling an internal heat exchange element of the reactor to take away reaction heat, or controlling a H2/CO ratio at the inlet of the reactor; in the fluidized bed Fischer-Tropsch synthesis reactor, reaction heat is taken away by circulation of boiler water between a heat transfer element in the reactor and steam drum, and the temperature in the reactor is controlled by controlling the pressure of the steam drum.

Preferably by mixing fresh feed gas and the purge gas, the H2/CO ratio of the gas at the inlet of the fluidized bed reduction reactor is adjusted to be greater than 15, and more preferably, the H2/CO ratio of the gas at the inlet of the fluidized bed reduction reactor is 20.

The temperature in the reactor is controlled by mixing fresh feed gas and the purge gas to meet the requirements, saving heat exchange elements, and reducing the disturbance of the heat transfer element to the bed.

The catalyst loading and unloading of the fluidized bed reduction reactor and the fluidized bed Fischer-Tropsch synthesis reactor are realized by gravity flow or gas dense phase transportation, and a catalyst feed port of a fluidized bed reactor is connected with a catalyst charging tank by a catalyst feed pipe, and a catalyst discharge port of the fluidized bed reactor is connected with a catalyst collection tank by a catalyst discharge pipe; the catalyst is transported from the catalyst charging tank to the fluidized bed reactor by gravity flow of an equipment height difference, and the catalyst is transported from the fluidized bed reactor to the catalyst collection tank by gas dense phase transportation, during the dense-phase gas transport, a transported fluid is a high-pressure gas, and a flow rate of the transport fluid is 0.5-4 m/s.

The reaction water produced by the catalyst reduction unit and the Fischer-Tropsch synthesis unit enters the reaction water separation unit for deaerating and deoiling, and then enters a reaction water rectification tower for rectification and separation; a product extracted from top of the reaction water rectification tower is high concentration oxygen-containing organic matter, and the waste water containing a small amount of organic acid is extracted from tower bottom and sent to sewage treatment.

The reaction water rectification tower is a packed tower or a tower plate tower, preferably a plate tower; mass percentage of the oxygen-containing organic matter in the reaction water is 4%-15%; components of the high concentration oxygen-containing organic matter extracted from the top of the reaction water rectification tower include formaldehyde, methanol, acetaldehyde, ethanol, propionaldehyde, acetone, and propanol, and water content is 10-50%; content of the organic acid in the waste water extracted from the tower bottom of the reaction water rectification tower is less than 0.5%, and the main component of the organic acid is acetic acid.

The H2/CO ratio in the fresh synthesis gas is 1-6; the catalyst is an iron-based Fischer-Tropsch synthesis catalyst or a cobalt-based Fischer-Tropsch synthesis catalyst.

The gas-solid separation elements in the fluidized-bed Fischer-Tropsch synthesis reactor and the fluidized-bed reduction reactor are several cyclone separators in parallel, and each cyclone separator is a double-inlet cyclone separator. The bottom of the cyclone separator is connected with a particle discharge pipe to return the separated catalyst solids to the main reaction zone of the fluidized bed Fischer-Tropsch synthesis reactor, and a wing valve is provided at the lower end of the particle discharge pipe. The gas-solid separation element of the fluidized bed Fischer-Tropsch synthesis reactor of the present invention has large flexibility and high separation efficiency.

Compared with the prior art, the present invention has the following advantages:

(1) Compared with the low-temperature Fischer-Tropsch synthesis technology, the high-temperature Fischer-Tropsch product of the present invention can produce oil products such as fuel oil and high-end lubricating oil, as well as other bulk chemicals such as ethylene and ethanol. Alpha olefins in oil products can also be processed into high-value fine chemicals such as high-carbon alcohols, realizing the diversification of coal chemical products and improving the anti-risk capability of the Fischer-Tropsch synthesis equipment plant.

(2) The present invention improves the design of the traditional waste heat boiler. In the existing Fischer-Tropsch synthesis process, the high-temperature gas from the Fischer-Tropsch synthesis reactor contains solids, and using the boiler to recover heat will cause the boiler to block and cause the system to fail to operate stably for a long time; the present invention changes the waste heat boiler to a vertical type, and the reaction gas flows through the tube side in the waste heat boiler and goes down in the direction, thereby avoiding the settled particles from staying in the heat exchanger and blocking the pipeline, solving the problem of easy blockage of the waste heat boiler, and overcoming the Technical prejudice; the present invention not only ingeniously recovers heat, but also ensures the safe operation of the process, which can run stably for a long time; the energy of the system is well utilized, and the energy consumption is reduced;

(3) The present invention also improves the cooling and dust removal process of the Fischer-Tropsch synthesis reaction gas. In the existing Fischer-Tropsch synthesis process, the high-temperature gas after the reaction needs to be cooled, but the waste heat boiler cannot be used to recover heat, so the subsequent quench tower is used to cool the high-temperature gas. Therefore, the quench tower needs a recirculation cooler to provide cooling, which makes the quench tower system more complicated and increases energy consumption; in the present invention, a part of the reaction heat is recovered by the uniquely designed waste heat boiler, so that the quench tower can be washed and cooled without using a recirculation cooler, which simplifies the quench tower operation and reduces the energy consumption of the quench tower.

(4) In the present invention, the circulating liquid in the tower is used for washing and cooling, and the solid content of the circulating liquid in the liquid accumulating tank in tower is lower, which will not cause blockage of the quench tower and improve the operation stability.

(5) The present invention designs a catalyst reduction unit, organically combines the Fischer-Tropsch synthesis reactor and the reduction reactor to realize the reuse of the purge gas in the synthesis unit, and saves the energy consumption of the fresh gas and the reduction recycle compressor in the traditional reduction method. One of the key factors for the successful operation of the Fischer-Tropsch synthesis process is the catalyst and its reduction; the catalyst reduction unit of the present invention facilitates the continuous progress of the Fischer-Tropsch synthesis reaction and realizes the on-steam replacement of the catalyst in the synthesis unit; compared with the existing catalyst reduction unit, the existing catalyst reduction unit uses fresh reducing gas to reduce the catalyst, because the fluidized bed needs to maintain a higher space velocity to meet the operational requirements of the fluidized bed, in fact, the amount of the reducing gas consumed by the catalyst reduction is relatively small, and majority of the hydrogen needs to be circulated back through the recycle compressor, resulting in higher energy consumption. However, the present invention has found through experiments that the purge gas in the Fischer-Tropsch synthesis unit contains reducing gas and has a higher pressure, which meets the feed requirements of the reduction unit. Therefore, the present invention creatively uses purge gas as the reducing gas of the reduction unit, which greatly simplifies the reduction unit. Since the hydrogen-to-carbon ratio of the tail gas of the low-temperature Fischer-Tropsch synthesis is lower than 4, and the carbon dioxide content in the oxidation state is higher, about 20%, which is easy to entrain liquid hydrocarbons and is not suitable as a reducing gas. The tail gas of the high-temperature Fischer-Tropsch synthesis unit of the present invention is generally around 40, and the carbon dioxide content is less than 10%, all of which are dry gas, and the hydrocarbon content in the synthesis tail gas is equivalent to the hydrocarbon content of the fresh reducing gas+circulating gas used, which is suitable as a reducing gas.

Figure 1:
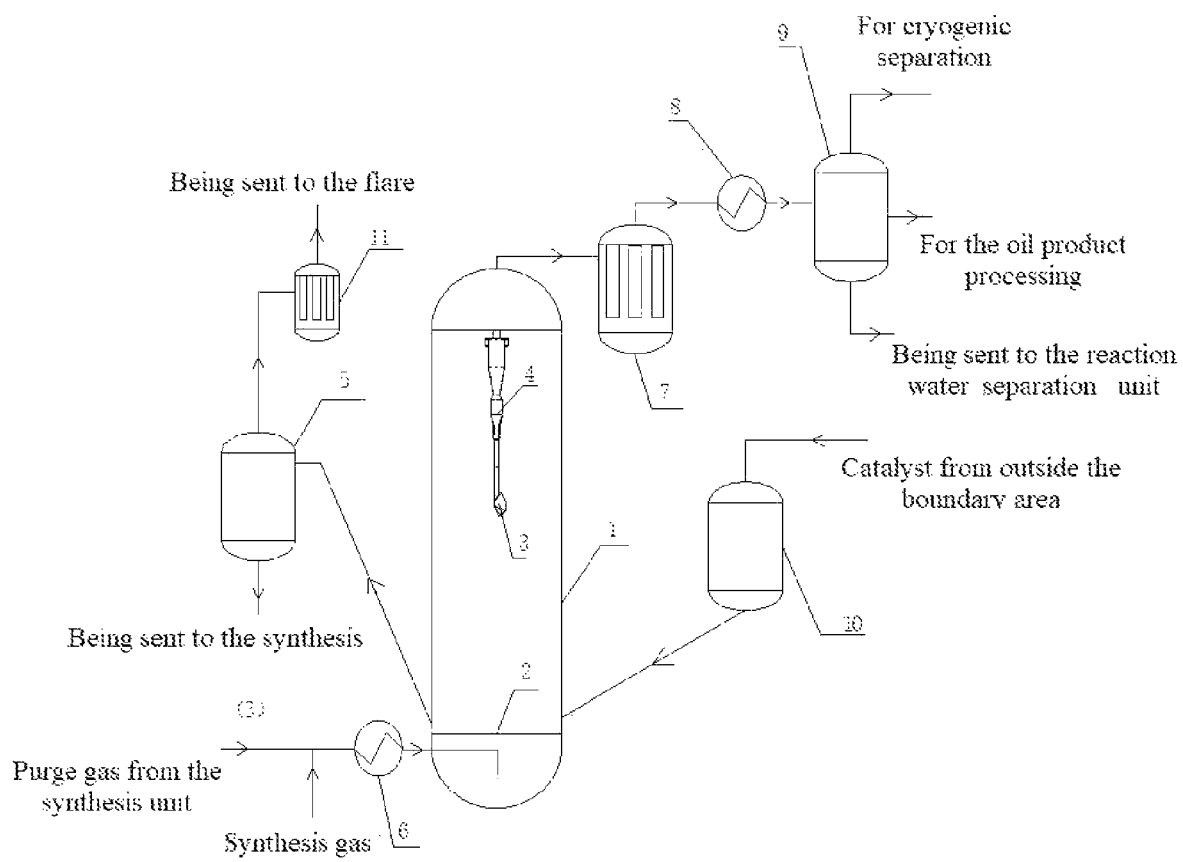
FIG. 1 is a process flow diagram of the catalyst reduction unit of the present invention.

in the figure, 1 is a fluidized bed reduction reactor; 2 is a reducing gas distributor; 3 is a wing valve; 4 is a reduction cyclone gas-solid separator; 5 is a catalyst charging tank; 6 is a reducing gas preheater; 7 is a reactor outlet gas-solid filter; 8 is a reduction cooler; 9 is a gas-liquid separator; 10 is an intermediate tank for the catalyst after reduction; 11 is a gas-solid filter for the charging tank; 13 is a fluidized bed Fischer-Tropsch synthesis reactor; 14 is a synthesis gas distributor; 15 is a heat transfer cold tube; 16 is a synthesis cyclone gas-solid separator; 17 is a reaction gas heater; 18 is a waste catalyst collection tank; 19 is a gas-solid filter for the waste catalyst collection tank; 20 is a steam drum; 21 is a steam drum water circulating pump; 22 is a synthesis recycle compressor; 23 is a quench tower; 24 is a quench tower circulating pump; 25 is a heavy oil cooler; 26 is a liquid-solid filter; 27 is a heavy oil intermediate tank; 28 is a heavy oil spray pump; 29 is a cooler; 30 is a three-phase separator; 31 is a waste heat boiler; 32 is a liquid accumulating tank in tower; 33 is a gas-gas heat exchanger; 34 is a deaerator; 35 is a reaction water heat exchanger; 36 is a waste water transfer pump; 37 is a reaction water rectification tower; 38 is a bottom reboiler; 39 is a top condenser; 40 is a reflux tank; 41 is a top reflux pump; (1) is fresh synthetic air stream, (2) is synthetic circulating air stream, (3) is purge air stream, (4) is heavy oil product stream, (5) is light oil product stream, (6) is reaction water stream, (7) is steam drum by-product steam stream, (8) is by-product steam stream of the waste heat boiler; (9) is reactor outlet gas stream, (10) is high-temperature gas stream after heat recovery; (11) is heavy oil stream, (12) is Fischer-Tropch synthesis reaction water, (13) is stream produced at the tower bottom of the rectification tower, and (14) is stream at the top of the rectification tower.

DESCRIPTION OF THE EMBODIMENTS

The present invention will be described in detail below in conjunction with specific embodiments. The following embodiments will help those skilled in the art to further understand the present invention, but do not limit the present invention in any form. It should be pointed out that for those of ordinary skill in the art, a number of modifications and improvements can be made without departing from the concept of the present invention. These all belong to the protection scope of the present invention.

A method for producing a hydrocarbon by high-temperature Fischer-Tropsch synthesis, and the specific production process is as follows:

(1) the purge gas of the synthesis unit is used as the reducing gas to be heated to a certain temperature and then enters the fluidized bed reduction reactor 1, where the catalyst reduction reaction occurs above 260° C.: reaction temperature range of 260–500° C., pressure of 0-5.0 MPa, and an operating linear velocity of 0.1-1.0 m/s. The outlet gas of the fluidized bed reduction reactor 1 passes through the reactor outlet gas-solid filter 7 to remove solids, then enters the reduction cooler 8 to be cooled to normal temperature, and then enters the gas-liquid separator 9 for gas-liquid separation, and the gas after liquid separation is cryogenically separated to recover gaseous hydrocarbons; the reduced catalyst is transported to the catalyst charging tank 5, and the catalyst is supplemented to the fluidized bed Fischer-Tropsch synthesis reactor 13 as needed; it should be noted that there is no synthesis purge gas during the initial startup of the equipment, and the first batch of catalyst reduction is directly reduced with the synthesis gas in the synthesis reactor; the gas-solid separation element in the fluidized bed reduction reactor 1 includes several cyclone separators 4 in parallel, and each cyclone separator 4 is a double-inlet cyclone separator. The bottom of the cyclone separator is connected with a particle discharge pipe to return the separated catalyst solids to the main reaction zone of the fluidized bed Fischer-Tropsch synthesis reactor, and a wing valve 3 is provided at the lower end of the particle discharge pipe. The gas-solid separation element of the fluidized bed Fischer-Tropsch synthesis reactor of the present invention has large flexibility and high separation efficiency. There is no heat transfer cold tube in the fluidized bed reduction reactor 1, and the temperature in the reactor is controlled by the H2/CO ratio at the inlet of the reactor.

(2) Fresh synthesis gas with H2 and CO as the main components is mixed with a synthesis circulating gas, and after the mixture is heated to temperature not lower than 100° C. by one or multi-stage heat exchangers, it enters a fluidized bed Fischer-Tropsch synthesis reactor 13 for the Fischer-Tropsch synthesis reaction under an action of Fischer-Tropsch synthesis catalyst over the reaction temperature range of 300–500° C., a pressure of 1.0-5.0 MPa, and an operating linear velocity of 0.3-1.0 m/s;

(3) In the fluidized bed Fischer-Tropsch synthesis reactor 13, the gas distribution equipment at the bottom of the reactor ensures good fluid distribution in the gas fluidized bed: heat is removed through the internal heat exchange cold tube and steam is by-produced: the catalyst particles entrained in the outlet gas is separated by the built-in cyclone gas-solid separation equipment on the top: after a certain period of time, the catalyst needs to be partially discharged and partially added on-steam to ensure the stability of the catalyst concentration, activity and average selectivity: the realization of the on-steam addition and discharge of the catalyst in the reactor requires a waste catalyst collection tank in addition to the intermediate tank for the catalyst after reduction. The gas phase outlets of the intermediate tank for the catalyst after reduction and the waste catalyst collection tank are provided with one or more filters to capture the particles entrained in the catalyst exhaust gas, and the amount of catalyst added or discharged can be measured with a weighing instrument or a level gauge: the synthesis cyclone gas-solid separator 16 in the fluidized bed Fischer-Tropsch synthesis reactor 13 is similar with the gas-solid separation internal component of the fluidized bed reduction reactor 1.

(4) The high-temperature gas from the fluidized-bed Fischer-Tropsch synthesis reactor 13 first passes through a waste heat boiler 31, and part of the heat is recovered through the way of generating steam by heat change between gas and boiler water. The high-temperature gas can travel through the tube side or the shell side, and flowing through the shell side is best to prevent solids from clogging. When high-temperature gas flows through the shell side, a gas purging equipment is installed in the shell side of the waste heat boiler to regularly clean the settled solids to prevent clogging and decrease in heat exchange efficiency;

(5) The gas after the heat exchange of the waste heat boiler enters the dust removal cooling unit to remove the catalyst particles, which are entrained in the high-temperature gas, and recover part of the high-temperature condensed heavy oil products. The generated heavy oil products are filtered and decompressed and sent to the product processing unit;

(6) The gas from the dust removal cooling unit is cooled by one-stage or multi-stage heat exchangers, and then sent to a three-phase separator 30 to separate the water phase, the oil phase and the gas phase. After the oil phase is decompressed, it is sent to the product processing unit as a light oil product. After the water phase is decompressed, it is sent to the reaction water separation unit to recover the oxygen-containing organic matter. When the reduction unit is not in operation, the gas phase is cryogenically separated to recover gaseous hydrocarbons, and the gas phase is used as the reduction feed gas when the reduction unit is started, and majority of the gas is recycled to the synthesis reactor through the synthetic recycle compressor. The effective components recovered from the purge gas are mainly LNG (methane), C2-C4 olefins and other high value-added products.

(7) The reaction water produced by synthesis is deaerated and deoiled, and then sent to the reaction water rectification tower for rectification to separate oxygen-containing organic matter. Before entering the rectification tower, the reaction water first exchanges heat with the wastewater discharged from the tower, and then enters the rectification tower. The product extracted from the top of the rectification tower is high-concentration oxygen-containing organic matter, and the waste water containing a small amount of organic acid extracted from the tower bottom is cooled by heat exchange and sent to sewage treatment.

The catalyst used in the present invention is a common iron-based and cobalt-based Fischer-Tropsch synthesis catalyst. The catalyst should be able to operate continuously and stably for a long time in the fluidized bed reactor; the fresh synthesis gas is mainly H2 and CO, and the H2/CO ratio at the inlet of the synthesis reactor is controlled to 1-6. The main components of the purge gas of the synthesis unit are as follows:

| Component | Content mol % |
|---|---|
| Hydrogen | 40-45 |
| Carbon monoxide | 0.5-2 |
| Carbon dioxide | 5-10 |
| Argon | 0.5-1 |
| Nitrogen | 1-3 |
| Methane | 10-20 |
| C2+ | 20-25 |

The components of the purge gas in the table fully meet the reduction requirements of the catalyst. In the later stage of reduction, a little synthesis gas can be added to decrease the hydrogen-carbon ratio of the reducing gas to reduce the catalyst.

The fluidized bed Fischer-Tropsch synthesis reactor 13 includes a gas distribution element, a gas-solid cyclone separation element, and an internal heat transfer element.

The fluidized bed reduction reactor may not include a heat transfer element depending on the composition of the reducing gas.

The temperature control of the fluidized bed reduction reactor 1 can be achieved by controlling the gas temperature at the inlet and adjusting the H2/CO ratio of the reactor inlet according to the composition of the reducing gas and the catalyst activity at different stages of reduction; the temperature control of the fluidized bed Fischer-Tropsch synthesis reactor 13 mainly realizes that the boiler water takes away the reaction heat by the internal heat exchange elements of the reactor, and the boiler water circulates between the steam drum and the heat transfer element, and the reactor temperature is controlled in cascade by controlling the pressure of the steam drum.

The catalyst loading and unloading of the fluidized bed reduction reactor 1 and the fluidized bed Fischer-Tropsch synthesis reactor 13 are realized by gravity flow or gas dense phase transportation. After reduction, the catalyst is sent to the fluidized reactor by the charging tank 5 by gravity flow of an equipment height difference, and during the transportation, a positive pressure difference between the storage tank and the reactor should be maintained, and the transportation pipeline can be equipped with transportation air to prevent blockage of the pipeline; the catalyst is sent from the fluidized bed reactor to the storage tank mainly by gas dense phase transportation, the transportation speed of which is mainly adjusted by the differential pressure between the catalyst fluidized bed reactor and the storage tank. It is best to control the flow rate of the transported fluid at 0.5-4 m/s, and too low flow rate will easily cause the catalyst to settle and block, and too high flow rate will cause rapid abrasion of the pipeline; the high-pressure gas is high-pressure inert gas (such as nitrogen) or synthesis gas.

The preheating mode of the feed gas at the inlet of the fluidized bed Fischer-Tropsch synthesis reactor 13 is determined according to the process operation requirements and the optimized design of the heat exchange network to ensure a smooth first start-up and the highest comprehensive energy utilization efficiency during stable operation.

The waste heat boiler 31 mainly produces saturated steam. The high-temperature gas at the outlet of the fluidized-bed Fischer-Tropsch synthesis reactor 13 can travel through the tube side or the shell side, and travel through the shell side is best. The gas flows through the tube side of the waste heat boiler and goes down in the direction to prevent the settled particles from staying in the heat exchanger to block the pipeline; when the high-temperature gas flows through the shell side, an intermittent gas purging equipment is set up to ensure that the settled solid particles are cleaned in time. When the high-temperature gas flows through the tube side, the waste heat boiler should be set to switch between one open and one standby, which is convenient for maintenance and cleaning.

If the waste heat boiler 31 needs to improve the efficiency of heat recovery and utilization, it is necessary to reduce the pressure of the by-produced steam; on the contrary, reducing the heat recovery efficiency can by-produce high-quality steam with higher pressure. According to the actual process requirements and the economy of the equipment, the operating pressure of the waste boiler is reasonably optimized.

In the light oil produced by the catalyst reduction unit and the Fischer-Tropsch synthesis unit, and the heavy oil produced by the Fischer-Tropsch synthesis unit of the present invention, olefins, especially the high value-added alpha olefins that are scarce in the market, are the main ones, with olefin content above 50%.

The method of recovering the effective components from the purge gas of the Fischer-Tropsch synthesis unit can be cryogenic separation, low-temperature oil washing combined with cryogenic separation, and the separation requirements are to meet the downstream processing requirements of methane and C2-C4 olefins.

Among them, the dust removal cooling unit connected to the Fischer-Tropsch synthesis unit can adopt one of the following two modes: (1) quench tower washing and cooling mode; (2) cooling mode after gas-solid separation. Preferably, the quench tower washing and cooling mode.

1) the quench tower washing and cooling mode:

The quench tower 32 is a tower plate tower (packed tower is easy to be blocked by the settled solids). In the quench tower washing and cooling mode, the dust removal cooling unit is composed of at least the quench tower 32, the quench tower circulating pump 24 and the heavy oil spray pump 28. Gas dust removal is realized in the quench tower through product heavy oil spraying and washing, and quench tower circulating liquid rewashing on the tower plate, and gas cooling is realized through low-temperature heavy oil spraying. The quench tower circulating liquid is the heavy oil collected in the liquid accumulating tank in tower 32 under the last tower plate, can also be circulated with heavy oil in the tower bottom. Because the solid content of heavy oil in the liquid accumulating tank in tower is lower, the heavy oil circulation in the liquid accumulating tank in tower is optimal.

2) Cooling Mode after Gas-Solid Separation

The dust removal cooling unit adopting the cooling mode after gas-solid separation at least consists of a gas-solid separation equipment, a cooler, and a gas-liquid separator. The gas-solid separation equipment can be one or a combination of an electrostatic precipitator, a gas-solid filter, and a gas-solid inertial separator; the cooler can be an air cooler or a water cooler or a combination of the two. The gas-liquid separator has at least one three-phase separator to separate the tail gas, water phase, and oil phase.

The organic matter content in the reaction water produced by the catalyst reduction unit and the Fischer-Tropsch synthesis unit is 4%-15%; the reaction water rectification tower 37 can be a packed tower or a tower plate tower, and large equipment is preferably a tower plate tower; the oxygen-containing organic matter at the top of the tower mainly includes formaldehyde, methanol, acetaldehyde, ethanol, propionaldehyde, acetone, propanol, etc. The main composition is acetone, ethanol, and n-propanol. The water content is generally controlled at 10-50% according to subsequent processing requirements. The organic acid content of the acid-containing wastewater in the tower bottom is less than 0.5%, mainly acetic acid; the oxygen-containing organic matter at the top of the tower can be deeply separated directly into various single-component products, or the aldehydes and ketones can be mixed and reduced to alcohol products before separation. The deep separation of the top products is the existing technology and will not be repeated here.

The invention provides a method for high-temperature Fischer-Tropsch synthesis using the fluidized bed reactor that can operate stably and continuously for a long time. By adding a waste heat boiler to recover the heat of the outlet gas of the reactor, the high-temperature Fischer-Tropsch product of the method can produce oil products such as fuel oil and high-end lubricating oil, as well as other bulk chemicals such as ethylene and ethanol. Alpha olefins in oil products can also be processed into high-value fine chemicals such as high-carbon alcohols.

Figure 2:
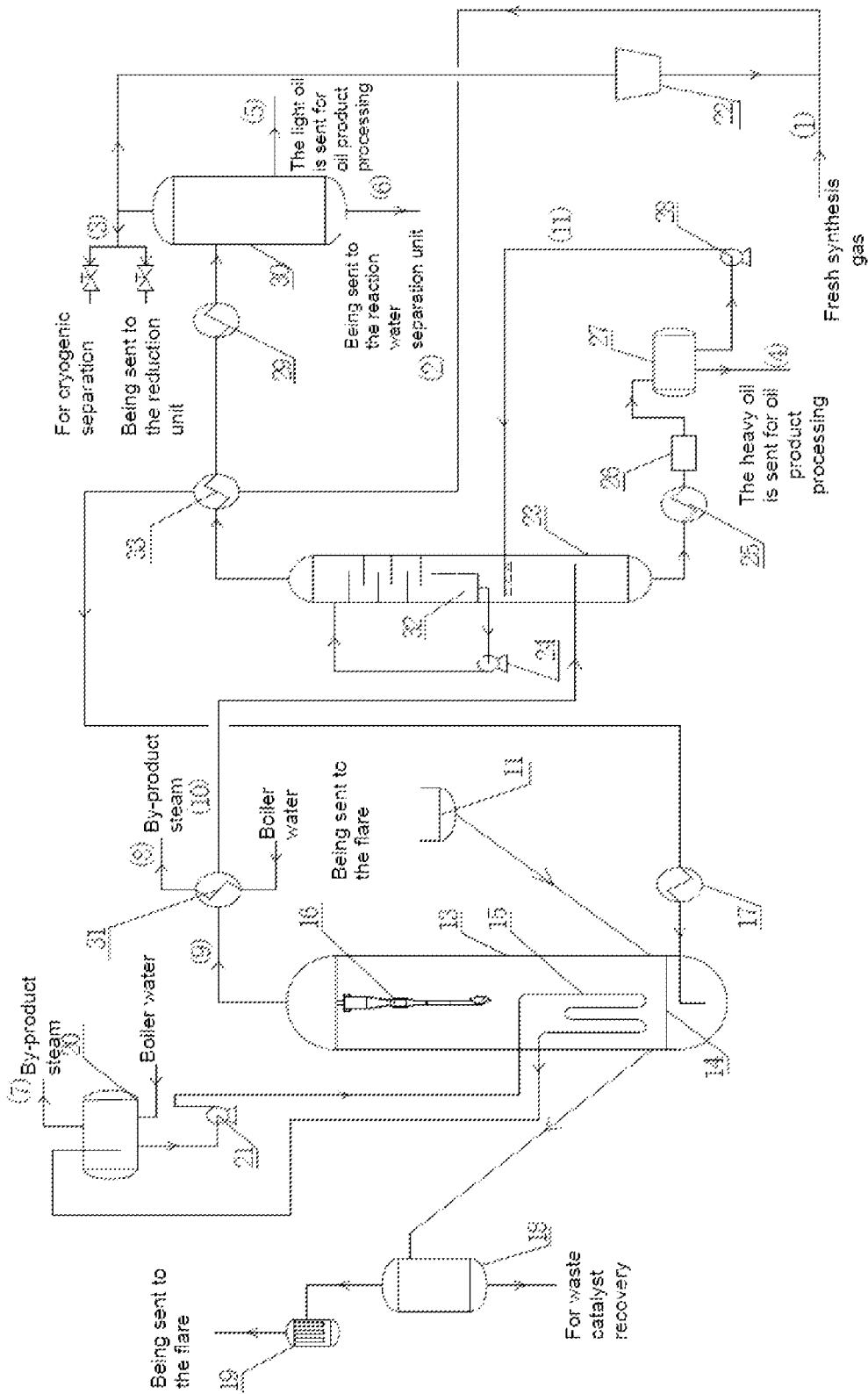
FIG. 2 is a process flow diagram of the Fischer-Tropsch synthesis unit of the present invention.
Figure 3:
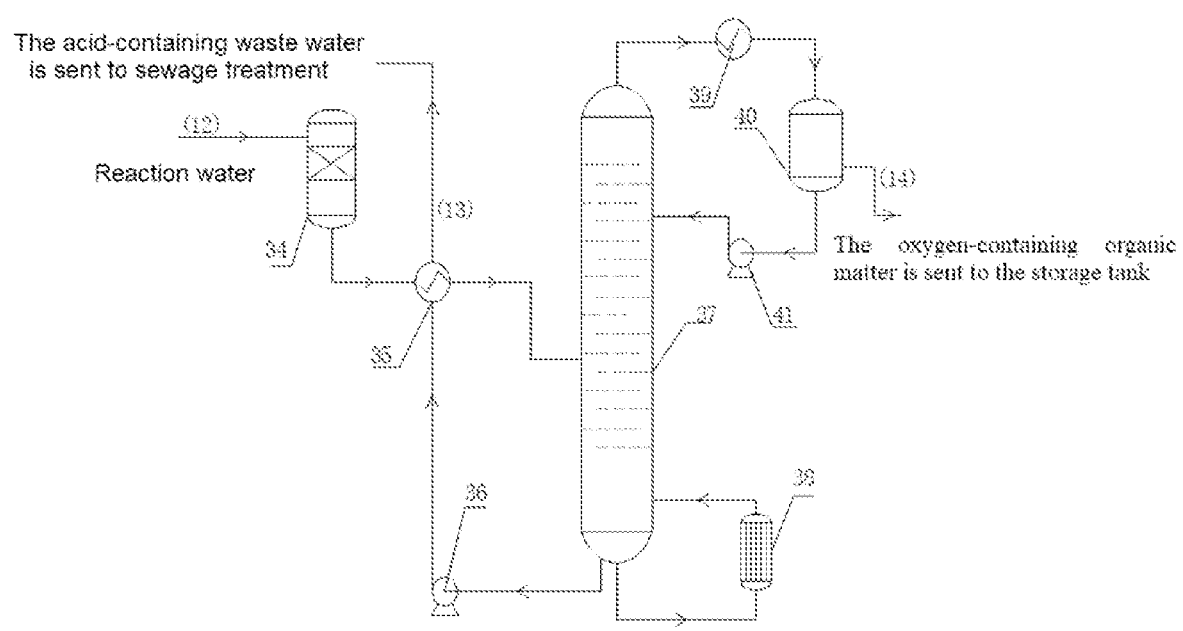
FIG. 3 is a process flow diagram of the reaction water separation unit of the present invention.

The specific process flow of the present invention is shown in FIG. 1, FIG. 2 and FIG. 3, and the equipment used in the present invention will be described in detail below in conjunction with the process flow chart:

As shown in FIG. 1, the catalyst reduction unit is operated intermittently. The reducing gas is mainly synthetic purge gas, and finally the catalyst is reduced to a catalyst that can be used directly in the Fischer-Tropsch synthesis reaction. The reduction products are mainly water and hydrocarbons. The treatment process of each batch of catalyst can be divided into four steps, namely loading, reduction, adjustment and unloading.

The fresh catalyst from outside the boundary area is measured and loaded into the catalyst charging tank 5, the pressure of the catalyst charging tank 5 is adjusted, and the gate valve on the connecting pipeline between the catalyst charging tank 5 and the fluidized bed reduction reactor 1 is opened to add catalyst to the reduction reactor.

The purge gas from the synthesis section is used as reducing gas to enter the fluidized bed reduction reactor 1 after being heated and preheated by the reducing gas preheater 6. The reduction reactor is a fluidized bed reactor. The gas entering the fluidized bed reduction reactor 1 first passes through a reducing gas distributor 2 for uniform gas distribution, so that the catalyst in the fluidized bed reduction reactor 1 is uniformly fluidized. If necessary, the fluidized bed reduction reactor 1 controls the reduction reaction temperature at 260 to 500° C. by controlling the outlet temperature of the gas preheater 6. According to the operating temperature, operating pressure and inlet flow capacity of the fluidized bed reduction reactor 1, the gas inlet operating linear velocity is determined as 0.1-0.7 m/s. The gas-solid mixture passes through a built-in reducing cyclone gas-solid separator 4 to capture most of the catalyst particles.

The outlet gas of the reducing gas distributor 1 enters the reactor outlet gas-solid filter 7 to further separate the catalyst entrained in the gas, and the filtered gas without solid particles enters the reduction cooler 8, where it is cooled to 40-60° C., and then enters the gas-liquid separator 9. In the gas-liquid separator 9, the gas phase is cryogenically separated to recover a gaseous hydrocarbon, and the pressure of the reduction reactor is controlled to be 0~5.0 MPa according to the purge gas pressure of the synthesis unit; the oil phase (if any) is sent to the oil product processing unit; and the water phase is sent to the reaction water separation unit. After the reduction of a batch of catalyst is completed, the pressure of the catalyst charging tank after reduction is adjusted, and the gate valve on the reduction reactor is opened. The fluidized catalyst in the fluidized bed reduction reactor 1 will flow into the catalyst charging tank 5, and the gas will pass through the gas-solid filter for the charging tank 11 arranged on the exhaust pipe of the charging tank to separate the entrained catalyst and enter the flare system. It should be noted that there is no synthesis purge gas for reduction during the initial startup of the equipment, and the first batch of catalysts can be directly reduced with synthesis gas in the synthesis reactor.

Under normal circumstances, the high-temperature Fischer-Tropsch synthesis unit in FIG. 2 is continuously operated. The fresh synthesis gas from outside the boundary area is mixed with the circulating tail gas from the three-phase separator 30 and compressed by the synthesis circulation compressor 22 to form the reaction gas, and then enters the gas-gas heat exchanger 33 to exchange heat with the gas at the outlet of the chilling tower. The reaction gas is preheated to 140° C., and then enters the synthesis gas preheater 17 to be heated to above 160° C., and enters the fluidized bed Fischer-Tropsch synthesis reactor 13. The gas entering the fluidized bed Fischer-Tropsch synthesis reactor 13 first passes through a synthesis gas distributor 14 for uniform gas distribution, so that the catalyst in the fluidized bed Fischer-Tropsch synthesis reactor 13 is uniformly fluidized. The fluidized-bed Fischer-Tropsch synthesis reactor 13 transfers the reaction heat through the built-in multi-pass heat-transfer cold tube 15 to ensure the reaction temperature at 300-500° C. According to the operating temperature, operating pressure and inlet flow capacity of the fluidized bed Fischer-Tropsch synthesis reactor 13, the gas inlet operating linear velocity is determined as 0.3-0.7 m/s. The synthesis gas undergoes a Fischer-Tropsch synthesis reaction in the fluidized bed Fischer-Tropsch synthesis reactor 13, and the gas-solid mixture passes through a built-in synthesis cyclone gas-solid separator 16 to capture most of the catalyst particles. The cooling medium running in the heat exchange cold tube is boiler feed water forcedly circulated by the steam drum water circulating pump 21, and the water-steam mixture after the heat exchange enters the steam drum 20 to by-produce medium and high-pressure steam. Boiler water can be added not only from the upper part of the steam drum, but also directly from the inlet of the steam drum water circulation pump 21, which can realize the demand for rapid cooling in emergency situations.

The catalyst loading volume concentration in the dense phase zone of the fluidized bed Fischer-Tropsch synthesis reactor is 10-30%. In order to ensure that the activity, selectivity and loading of the catalyst in the reactor remain basically stable, it is necessary to regularly add and discharge the catalyst on-steam. After reduction, the fresh catalyst in the catalyst charging tank 11 flows into the fluidized-bed Fischer-Tropsch synthesis reactor 13 by gravity. By adjusting the pressure of the catalyst charging tank 11 after reduction, the differential pressure between the catalyst charging tank 11 and the fluidized-bed Fischer-Tropsch synthesis reactor 13 is controlled to ensure the catalyst feeding rate. The catalyst in the fluidized bed Fischer-Tropsch synthesis reactor 13 needs to be discharged regularly to maintain the stability of the reaction. By adjusting the pressure of the waste catalyst collection tank 18 to ensure the differential pressure between the fluidized bed Fischer-Tropsch synthesis reactor 13 and the waste catalyst collection tank 18, the catalyst unloading rate can be adjusted. The exhaust pipe of the waste catalyst collection tank 18 is provided with a gas-solid filter for the waste catalyst collection tank 19 to capture particles in the gas. After reduction, the catalyst charging tank and the waste catalyst collection tank have weighing instruments for accurate weighing to ensure that the catalyst load is basically unchanged.

The outlet gas of the fluidized-bed Fischer-Tropsch synthesis reactor enters the waste heat boiler 31 for further heat recovery to produce saturated steam, which is sent to the quench tower 23 for washing and cooling after passing through the waste heat boiler. The quench tower 23 is a tower plate tower. The gas enters from the lower part of the quench tower 23, and is first sprayed and washed by the liquid from the heavy oil intermediate tank 27, and the catalyst particles in the tower bottom slurry is prevented from settling. The bottom tower plate is provided with a bow-shaped liquid accumulating tank in tower 32, and the liquid in the liquid accumulating tank is returned to the first tower plate via the quench tower circulating pump 24. After being cooled and washed by the liquid on the tower plate and the liquid in the heavy oil intermediate tank, the outlet gas is basically free of catalyst particles. The gas from the quench tower 23 enters the gas-gas heat exchanger 33 to exchange heat with the feed gas to recover part of the heat. The heat-exchanged gas is further cooled to 40° C. by the cooler 29 and enters the three-phase separator 30. In the three-phase separator 30, majority of the gas phase is used as circulating gas, which is pressurized by the synthetic recycle compressor 22 and mixed with fresh synthesis gas as the feed gas at the reactor inlet, and a small part is used as the reducing gas of the reduction unit. When the reduction unit is not running, it is directly sent to the cryogenic separation unit to recover $CH_4$ and C2-C4 olefins, and the remaining gas enters the fuel gas pipeline network; the water phase is sent to the reaction water separation unit. The circulating gas in the gas phase and the fresh synthesis gas are mixed and then heated up by the gas-gas heat exchanger 33, and then further heated up by the reaction gas heater 17, and then enter the fluidized-bed Fischer-Tropsch synthesis reactor.

The liquid phase of the quench tower bottom is cooled by the heavy oil cooler 25 and then sent to the liquid-solid filter 26 for filtering to remove the catalyst particles in the heavy oil. After filtering, the heavy oil enters the heavy oil intermediate tank 27, and a part of the liquid in the heavy oil intermediate tank is pressurized by the heavy oil spray pump 28 and sent to above the gas distributor of the quench tower and below the liquid accumulating tank in tower, where the gas entering the tower is sprayed, washed and cooled, and the rest is used as a heavy oil product to be sent to the oil product processing unit.

Under normal conditions, the reaction water separation unit in FIG. 3 is continuously operated. The reaction water enters the deaerator 34 for deaerating under reduced pressure to remove non-condensable gas in the reaction water. The deaerator is a packed tower. After the reaction water passes through the deaerator, the pressure is reduced to normal pressure, and after the pressure is reduced, the reaction water exchanges heat with the gas at the outlet of the reaction water rectification tower 37, and then enters the reaction water rectification tower 37. The bottom reboiler 38 provides heat required for rectification by steam heating. The temperature of the outlet gas at the top of the tower is cooled by the top condenser 39, and the temperature drops to 40-60° C., and then enters the reflux tank 40. The liquid phase of the reflux tank is high-concentration oxygen-containing organic matter, and a part is sent as reflux liquid to the first tower plate at the top of the reaction water rectification tower via the top reflux pump 41, and the rest is sent to the oxygen-containing organic matter storage tank. The acid-containing waste water in the tower bottom is sent to sewage treatment after being cooled by heat exchange.

The following is the specific implementation process of the present invention:

Example 1

A system for producing a hydrocarbon by high-temperature Fischer-Tropsch synthesis, comprising a Fischer-Tropsch synthesis unit for making synthesis gas undergo a Fischer-Tropsch synthesis reaction, a reaction water separation unit for separating reaction water generated during the reaction, and a catalyst reduction unit for reducing catalyst.

1. Reduction Unit

The synthetic purge gas with flow capacity of 54300 $Nm^3/h$ of stream (3) is cut into the catalyst reduction unit, and the pressure of the fluidized bed reduction reactor 1 is maintained at 2.4 MPa. The gas heating temperature at the outlet of the reducing gas preheater 6 is set to 380° C. to heat the reducing reaction gas. The pressure of the catalyst charging tank 10 is set to 2.5 MPa, and the gate valve on the connecting pipeline between the catalyst charging tank 10 and the fluidized bed reduction reactor 1 is opened to add catalyst to the fluidized bed reduction reactor 1. The pressure of the reduction reactor is stabilized at 2.4 MPa by adjusting the flow rate of the gas for cryogenic separation, and the reduction of a batch of catalyst is completed for about 30 hours. After the catalyst reduction is completed, first the reduced catalyst intermediate tank 5 is pressurized to 2.1 MPa, and the gate valve of the fluidized bed reduction reactor 1 is opened; the fluidized catalyst in the fluidized bed reduction reactor 1 flows into the catalyst charging tank 5 under the action of the pressure difference, and the gas discharged from the top of the catalyst charging tank 5 passes through the gas-solid filter for the charging tank 11 to separate the entrained catalyst, and enter the flare. The reduction reactor is controlled by adjusting the outlet temperature of the reduction preheater 6.

2. Fischer-Tropsch Synthesis Unit

In this example, the synthesis operation pressure of the fluidized bed Fischer-Tropsch synthesis reactor 13 is 2.6 MPa, and the operation temperature of the synthesis reactor is 350° C. The reduced catalyst intermediate tank 5 is pressurized to 2.7 MPa, and the gate valve of the pipeline connecting the reduced catalyst intermediate tank 5 and the fluidized-bed Fischer-Tropsch synthesis reactor 13 is opened. The catalyst flows into the fluidized-bed Fischer-Tropsch synthesis reactor 13 under gravity. The fresh synthetic air stream (1) has flow capacity of 358,000 $Nm^3/h$, and the synthetic circulating air stream (2) has flow capacity of 515,000 $Nm^3/h$. The fresh synthetic air stream (1) and the synthetic circulating air stream (2) are mixed and enter the synthesis gas preheater 17 to be preheated to 160° C. and enter the fluidized-bed Fischer-Tropsch synthesis reactor 13, and then uniformly enter the synthesis reactor bed after passing through the synthesis gas distributor 14 so that the catalyst is uniformly fluidized for the Fischer-Tropsch synthesis reaction. The boiler water circulates between the heat transfer cold tube 15 and the steam drum 20 under the action of the steam drum water circulating pump 21 to remove the reaction heat. The steam drum by-product steam stream (7) has a by-product steam flow capacity of 178 t/h, and the reacted gas passes through the synthesis cyclone gas-solid separator 16 to separate entrained catalyst particles and then enters the waste heat boiler 31. The temperature of the reactor outlet gas stream (9) is 350° C., and the temperature of the high-temperature gas stream after heat recovery (10) after passing through the waste heat boiler 31 is 240° C., and the flow capacity of the by-product stream of the waste heat boiler (8) is 72 t/h. The gas after heat exchange with the waste heat boiler 31 enters the quench tower 23 from the gas distributor at the lower part of the quench tower 23, and is first sprayed and washed by the heavy oil with flow capacity of 50 t/h from the heavy oil stream (11) to remove most of the solid particles and heavy components and cooled, and then heated to perform mass and heat transfer with the heavy oil circulating back into the tower by the quench tower circulating pump 24 in the tower plate area. Part of the liquid stored in the liquid accumulating tank in tower 32 is used for the top circulation, and part overflows back to the tower bottom. The temperature of the gas at the top of the quench tower 23 is 160° C., which first exchanges heat with the synthesis gas through the gas-gas heat exchanger 33 to be cooled to 120° C., and at the same time the synthesis gas into the fluidized bed Fischer-Tropsch synthesis reactor 13 is preheated to 140° C. The reacted gas cooled by the gas-gas heat exchanger 33 enters the second cooler 29 to be further cooled to 40° C., and enters the three-phase separator 30 to separate the reaction water phase and oil phase. Most of the gas is recycled to the fluidized bed Fischer-Tropsch synthesis reactor 13 through the synthetic recycle compressor 22, and a small part of the gas is used as purge gas stream (3) and sent to the cryogenic separation unit to recover 6 t/h of methane; 2.7 t/h of ethylene, 6.3 t/h of propylene; and 5.8 t/h of butene. If the reduction unit is running, the stream (3) will be used as the reduction feed gas to participate in the catalyst reduction reaction before going to cryogenic separation. The light oil product stream (5) is sent to the product deep processing unit with flow capacity of 41.0 t/h, and 14 t/h of α-olefin can be separated, which is a high-quality raw material for PAO synthesis of high-end lubricants or synthesis of high-carbon alcohols. The heavy oil product stream (4) is sent to the product deep processing unit with flow capacity of 1.7 t/h, and the reaction water stream (6) is sent to the reaction water separation unit with a flow rate of 84.6 t/h.

In this example, the reactor stream after the reaction is finally cooled to 40° C., and a total heat of 177.0 MW is released. 84.6 MW of heat is recovered through the heat exchange of the waste heat boiler 31 and the gas-gas heat exchanger 33, and the energy recovery rate is 48%. If the heat released by the reactor is included, the total heat released is 296.7 MW. The heat recovered through the heat exchange of the steam drum 20, the waste heat boiler 31 and the gas-gas heat exchanger 33 is 204.1 MW, and the energy recovery rate is 68.8%.

3. Reaction Water Separation Unit

The flow rate of the Fischer-Tropsch synthesis reaction water (12) (containing a small amount of reaction water of the reduction unit) is 84.6 t/h, and the temperature is 40° C. It first enters the deaerator 34 to remove dissolved carbon dioxide, trace synthesis gas and other gas, enters the reaction water heat exchanger 35 to exchange heat with the 116° C., 80 t/h stream (13) produced at the tower bottom of the rectification tower of the tower bottom of the reaction water rectification tower 37, and then enters the reaction water rectification tower 37. The stream (13) produced at the tower bottom of the rectification tower is mainly acid-containing waste water. The reaction water rectification tower 37 provides heat through the bottom reboiler 38, and the gas phase in the tower is subjected to mass and heat transfer with the reflux phase at the top of the tower on the tower plate (or packed tower). The components at the top of the tower are cooled by the top condenser 39 to become liquid and then flow into the reflux tank 40, and part of them are refluxed by the top reflux pump 41. The oxygen-containing organic matter in the stream at the top of the rectification tower (14) enters the crude product storage tank with flow capacity of 4 t/h.

Compared with the existing high-temperature Fischer-Tropsch synthesis technology, the present invention recovers majority of the reaction heat through a specially designed waste heat boiler and has a higher energy efficiency ratio; compared with the existing low-temperature Fischer-Tropsch synthesis technology, the products of the present invention are mainly high value-added olefins. In addition to fuel, it can also produce high value-added high-end lubricating oil, olefins and other bulk chemicals, and high-carbon alcohols and other fine chemicals, realizing the diversity of coal chemical products and improving the anti-risk capability of the Fischer-Tropsch synthesis equipment.

The specific embodiments of the present invention have been described above. It should point out that the present invention is not limited to the above specific embodiments, and those skilled in the art can make various deformations or modifications within the scope of the claims, which does not affect the essence of the present invention.

What is claimed is:

1. A system for producing a hydrocarbon by high-temperature Fischer-Tropsch synthesis, comprising a Fischer-Tropsch synthesis unit for making synthesis gas undergo a Fischer-Tropsch synthesis reaction, a reaction water separation unit for separating reaction water generated during a reaction, and a catalyst reduction unit for reducing catalyst; wherein in the Fischer-Tropsch synthesis unit, fresh synthesis gas with H2 and CO as main components are mixed with synthesis circulating gas, pass through a synthesis gas preheater to be heated to a temperature of not lower than 100° C., enter a fluidized bed Fischer-Tropsch synthesis reactor to undergo the Fischer-Tropsch synthesis reaction under an action of a Fischer-Tropsch synthesis catalyst over the reaction temperature range of 300-500° C., a pressure of 1.0-5.0 MPa, and an operating linear velocity of 0.3-1.0 m/s; heat of high-temperature gas from the fluidized bed Fischer-Tropsch synthesis reactor is recovered by a waste heat boiler;

the high-temperature gas after heat is recovered by the waste heat boiler is washed and cooled by a quench tower and sent to a three-phase separator for separation to obtain a water phase, an oil phase and a gas phase; the oil phase is sent to a product processing unit as a light oil product, the water phase is sent to the reaction water separation unit after decompression, and the gas phase, after discharging part of purge gas, passes through a synthesis recycle compressor, as the synthesis circulating gas, to return to an inlet of the fluidized bed Fischer-Tropsch synthesis reactor.

2. The system for producing the hydrocarbon by high-temperature Fischer-Tropsch synthesis according to claim 1, wherein when the catalyst reduction unit is operating, the purge gas is used as reduction feed gas of the catalyst reduction unit, and when the reduction unit is in a closed state, the purge gas is used as fuel gas after cryogenic separation and recovery of methane and C2-C4 olefins.

3. The system for producing the hydrocarbon by high-temperature Fischer-Tropsch synthesis according to claim 1, wherein the waste heat boiler is a vertical heat exchanger structure, and the high-temperature gas and boiler water from the fluidized bed Fischer-Tropsch synthesis reactor exchange heat in the waste heat boiler to generate saturated steam; the high-temperature gas flows through a tube side, and a gas direction is from top to bottom; and at least two waste heat boilers are provided, one of which is a standby equipment.

4. The system for producing the hydrocarbon by high-temperature Fischer-Tropsch synthesis according to claim 1, wherein the quench tower is a tower plate tower, and a liquid accumulating tank in tower is provided under a bottom tower plate to collect heavy oil as a quench tower circulating liquid; the high-temperature gas after heat is recovered by the waste heat boiler enters the quench tower, and then is sprayed and washed with a heavy oil product extracted from tower bottom of the quench tower, and/or washed with a quench tower circulating liquid on a tower plate.

5. The system for producing the hydrocarbon by high-temperature Fischer-Tropsch synthesis according to claim 1, wherein a content of olefins in the light oil product and a heavy oil product is higher than 50%, and a main component of olefins is alpha olefin.

6. The system for producing the hydrocarbon by high-temperature Fischer-Tropsch synthesis according to claim 1, wherein the Fischer-Tropsch synthesis unit is configured to recover methane and C2-C4 olefins from the purge gas by conducting cryogenic separation or low-temperature oil washing combined with cryogenic separation.

7. The system for producing the hydrocarbon by high-temperature Fischer-Tropsch synthesis according to claim 1, wherein the catalyst reduction unit is a batch operation unit, and the purge gas from the Fischer-Tropsch synthesis unit enters a fluidized bed reduction reactor and reacts with the Fischer-Tropsch synthesis catalyst in the fluidized bed reduction reactor over the reaction temperature range of 260-500° C., a pressure of 0-5.0 MPa, and an operating linear velocity of 0.1-1.0 m/s; gas at an outlet of the fluidized bed reduction reactor is cooled to room temperature after removing a solid, and enters a gas-liquid separator for gas-liquid separation to obtain a gas phase and a liquid phase, and the separated gas phase is cryogenically separated to recover a gaseous hydrocarbon, and the separated liquid phase is separated into reaction water and a Fischer-Tropsch synthesized hydrocarbon; the reduced catalyst is sent to the Fischer-Tropsch synthesis unit.

8. The system for producing the hydrocarbon by high-temperature Fischer-Tropsch synthesis according to claim 7, wherein the fluidized bed reduction reactor is configured to control the reaction temperature by one or a combination of controlling gas temperature at an inlet of the fluidized bed reduction reactor, controlling an internal heat exchange element of the fluidized bed reduction reactor to take away reaction heat, and controlling a H2/CO ratio at the inlet of the fluidized bed reduction reactor; and the fluidized bed Fischer-Tropsch synthesis reactor is configured to take reaction heat by conducting circulation of boiler water between a heat transfer element in the fluidized bed Fischer-Tropsch synthesis reactor and a steam drum, and the temperature in the fluidized bed Fischer-Tropsch synthesis reactor is controlled by controlling pressure of the steam drum.

9. The system for producing a hydrocarbon by high-temperature Fischer-Tropsch synthesis according to claim 7, wherein catalyst loading and unloading of the fluidized bed reduction reactor and the fluidized bed Fischer-Tropsch synthesis reactor are realized by gravity flow or gas dense phase transportation, and a catalyst feed port of a fluidized bed reactor is connected with a catalyst charging tank by a catalyst feed pipe, and a catalyst discharge port of the fluidized bed reactor is connected with a catalyst collection tank by a catalyst discharge pipe; the catalyst is transported from the catalyst charging tank to the fluidized bed reactor by gravity flow of an equipment height difference, and the catalyst is transported from the fluidized bed reactor to the catalyst collection tank by gas dense phase transportation, during the dense-phase gas transport, a transported fluid is a high-pressure gas, and a flow rate of the transport fluid is 0.5-4 m/s.

10. The system for producing the hydrocarbon by high-temperature Fischer-Tropsch synthesis according to claim 1, wherein the reaction water produced by the Fischer-Tropsch synthesis unit is deaerated and deoiled, and then enters a reaction water rectification tower for rectification and separation; a product extracted from top of the reaction water rectification tower is high concentration oxygen-containing organic matter, and organic acid-containing waste water is extracted from tower bottom and sent to sewage treatment.

11. The system for producing the hydrocarbon by high-temperature Fischer-Tropsch synthesis according to claim 10, wherein the reaction water rectification tower is a packed tower or a tower plate tower; mass percentage of the oxygen-containing organic matter in the reaction water is 4%-15%; components of the high concentration oxygen-containing organic matter extracted from the top of the reaction water rectification tower include formaldehyde, methanol, acetaldehyde, ethanol, propionaldehyde, acetone, and propanol, and a water content is 10-50%; a content of the organic acid in the waste water extracted from the tower bottom of the reaction water rectification tower is less than 0.5%, and the main component of the organic acid is acetic acid.

12. The system for producing the hydrocarbon by high-temperature Fischer-Tropsch synthesis according to claim 8, wherein the fluidized bed reduction reactor is further configured to control the reaction temperature by mixing fresh feed gas and the purge gas to adjust a H2/CO ratio at the inlet of the fluidized bed reduction reactor to be greater than 15.

13. The system for producing the hydrocarbon by high-temperature Fischer-Tropsch synthesis according to claim 11, wherein the reaction water rectification tower is a tower plate tower.

* * * * *